United States Patent [19]

So et al.

[11] Patent Number: 4,911,515
[45] Date of Patent: Mar. 27, 1990

[54] OPTICAL FIBER COMMUNICATIONS SYSTEM WITH OPTICAL FIBER MONITORING

[75] Inventors: Vincent C. So; Paul J. Vella, both of Ottawa; Fred A. Huszarik, Kanata, all of Canada

[73] Assignee: Northern Telecom Limited, Montreal, Canada

[21] Appl. No.: 289,297

[22] Filed: Dec. 22, 1988

[51] Int. Cl.⁴ .................................................. G02B 6/28
[52] U.S. Cl. .............................. 350/96.16; 350/96.15; 455/610; 455/612
[58] Field of Search .............................. 455/610, 612; 350/96.15, 96.16

[56] References Cited

U.S. PATENT DOCUMENTS

| 4,436,365 | 3/1984 | Hodgins et al. | 350/96.16 |
| 4,678,265 | 7/1987 | Fink et al. | 350/96.15 X |
| 4,801,190 | 1/1989 | Imoto | 350/96.16 |

Primary Examiner—William L. Sikes
Assistant Examiner—John Ngo
Attorney, Agent, or Firm—R. John Haley

[57] ABSTRACT

Optical communications fibers extend from a central office to subscribers' premises for carrying signals in both directions between optical transmitters and receivers. Each subscriber's optical receiver continuously reflects back to its fiber, and then to the central office, about 20 percent of the light which it receives. At the central office the reflected light is monitored in turn for each subscriber, and is correlated with the signal transmitted to that subscriber to provide a signal for optical time domain reflectometry of the respective subscriber's fiber connection.

11 Claims, 1 Drawing Sheet

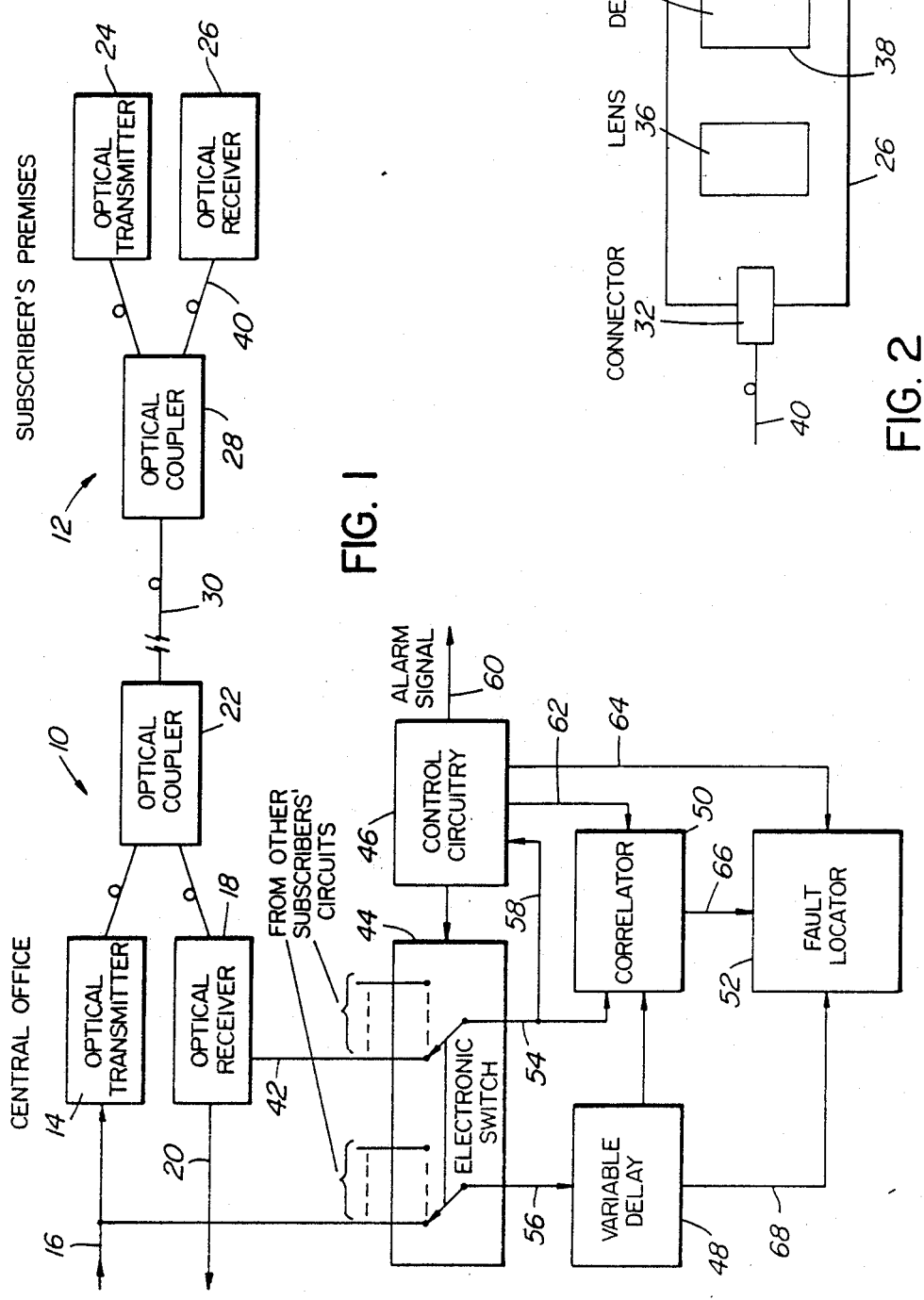

OPTICAL FIBER COMMUNICATIONS SYSTEM WITH OPTICAL FIBER MONITORING

This invention relates to optical fiber communications systems.

Optical fibers are being used increasingly for the transmission of signals in modulated optical form in telecommunications networks. It is desirable to provide such optical fibers for communications purposes not only among central offices of a telecommunications network, but also between such a central office and individual subscribers' premises. In the case of residential subscribers, an optical fiber may replace a conventional electrical two-wire subscriber line for telephone services, and may at the same time provide for bi-directional transmission of high speed signals, such as data and digital television signals.

Extending optical fibers to subscribers' premises makes it necessary to test such fibers prior to use, and desirable to provide such testing or monitoring of the fibers on an on-going basis for reliable operation, maintenance, and repair purposes. In view of the large numbers of subscribers involved, it is desirable for such testing to be achieved at a relatively low cost per subscriber, and for the testing process to be automated.

One way of providing for such testing is to provide an optical switch in the optical fiber receive path at each subscriber's premises, which switches a received optical signal between an optical receiver (which as is well known has a low reflectance) for normal operation and a reflector for testing purposes. In such an arrangement, for checking the integrity of the optical fiber a signal from the central office can be used to control the optical switch to temporarily substitute the reflector for the receiver, whereby signals transmitted from the central office are reflected back along the optical fiber by the reflector and can be monitored at the central office.

This arrangement has disadvantages in that it is complicated and expensive to implement, it involves optical switching at the subscribers' premises which is undesirable, and it is not able to identify the nature or location of faults which may occur or to distinguish between faults on the optical fiber and subscriber equipment failures.

Accordingly, an object of this invention is to provide an improved communications system.

According to this invention there is provided an optical fiber communications system comprising: a plurality of optical fibers each extending from a central location to a respective remote location, each optical fiber being coupled to an optical receiver at the respective remote location and being coupled to a respective optical transmitter and a respective optical receiver at the central location; means at the optical receiver at each remote location for continuously reflecting back to the respective optical fiber a minor part of light received via the fiber from the respective transmitter at the central location; monitoring means at the central location; and switching means at the central location for selectively connecting the monitoring means to an optical receiver at the central location for monitoring light received thereby via the respective fiber.

The central location can conveniently comprise a central office of a telecommunications network, and each remote location can conveniently comprise a subscribers' premises.

Because part of the light received at the optical receiver at each remote location is continuously reflected back to the respective optical fiber and thence to the central location, no switching is necessary at the remote locations so that complexity and costs are considerably reduced in relation to the prior art. This minor part of the light, i.e. less than 50 percent of the received light, which is reflected is desirably in a range from 1 to 30 per cent of the received light, and is optimally about 15% of the received light, to avoid excessive levels of reflected light and a resultant excessive reduction in light detected in the optical receiver at the remote location, while still providing a sufficient level of reflected light for convenient monitoring at the central location.

If the optical fibers between the central location and the remote locations are used for carrying optical signals, in both directions of transmission, with different wavelengths and/or frequencies for the two directions, then wavelength and/or frequency division demultiplexing techniques can be used at the central location to separate the reflected light from the optical signal transmitted from the respective remote location to the central location.

The monitoring means preferably comprises optical time domain reflectometry means, advantageously comprising means for variably delaying a signal supplied to an optical transmitter at the central location, and correlator means for correlating the delayed signal with a signal received by an optical receiver at the central location, the optical transmitter and the optical receiver being coupled to the same optical fiber. This enables transmitted signals themselves, for example at bit rates from 1 to 10 Mb/s, to be used in optical time domain reflectometer assessment of the optical fibers.

The invention will be further understood from the following description by way of example with reference to the accompanying drawings, in which:

FIG. 1 schematically illustrates parts of an optical fiber communications system in accordance with an embodiment of the invention; and FIG. 2 schematically illustrates parts of an optical receiver of the system of FIG. 1.

Referring to FIG. 1, there is illustrated part of a system, in accordance with this invention, comprising equipment at a central office 10 and equipment at a subscriber's premises 12.

For each subscriber, the central office equipment includes an optical transmitter 14 which is supplied via a line 16 with a digital signal to be transmitted, for example at a bit rate of the order of 1 to 10 Mb/s, an optical receiver 18 for producing a received digital signal on a line 20, and an optical coupler 22 to which the transmitter 14 and receiver 18 are coupled via respective optical fibers. The equipment at the subscriber's premises 12 similarly includes an optical transmitter 24, receiver 26, and coupler 28, the coupler 28 being coupled via respective optical fibers to the transmitter 24 and receiver 26, and being coupled to the coupler 22 to the central office via an optical fiber 30. Similar components 16 to 30 are provided for each other subscriber, but are not shown.

FIG. 2 illustrates parts of the optical receiver 26 at the subscriber's premises. The receiver 26 comprises an optical fiber connector 32 to which the optical fiber 40 from the coupler 28 is connected, an optical detector 34, and a lens 36 for focussing light from the fiber onto the detector 34. A front face 38 of the detector 34, or a surface of the connector 32 or lens 36, serves to reflect a minor part of the light arriving from the fiber 40 back along this fiber and thence, via the coupler 28, fiber 30, and coupler 22, to the optical receiver 18. This minor part of the light is preferably in the range of 1 to 30 percent of the light, and is desirably about 15%, providing a loss of about 0.7 dB to the light reaching the detector 34, which is comparable to the insertion loss of an optical switch as discussed for the prior art. For example, instead of being coated as in the prior art to prevent reflection, an air-glass interface of the lens 36 may be left uncoated to provide the desired level of light reflection.

In the optical receiver 18 the reflected light, together with any optical signal from the transmitter 24, is received, detected, amplified, and converted into a digital received signal on the line 20. An analog signal component representing the detected optical signal is produced on a line 42.

The central office equipment also includes, commonly for all of the subscribers, a two-pole electronic switch 44, control circuitry 46, a variable delay circuit 48, a signal correlator 50, and a fault locator 52. The two pole connections 54 and 56 of the switch 44 are coupled via the switch to the wires 42 and 16 respectively for each subscriber in turn under the control of the control circuitry 46. The switch pole 54 is connected via a wire 58 to the control circuitry 46, which monitors an averaged signal level on the wire 58 for each subscriber and, in the event that this level falls below a predetermined threshold, provides an alarm signal on a line 60 and triggers operation of the correlator 50 via a line 62 and of the fault locator 52 via a line 64. A drop in the signal level on the wire 58 below the threshold may be due to a fault in the equipment of the respective subscriber for whom the wire 42 is connected via the switch 44, or due to attenuation in or a break of the respective fiber 30.

For the connected subscriber, via the pole 56 of the switch 44 the digital signal on the line 16 is supplied to the variable delay circuit 40, which delays this signal by incrementally stepped amounts and supplies the delayed signal to one input of the correlator 50, to another input of which the analog signal from the respective wire 42 and the pole 54 of the switch 44 is supplied. The correlator 50 multiplies these input signals together and provides a correlated output signal on a line 66 to the fault locator 52, which is also supplied via a line 68 from the variable delay circuit 48 with a signal representing the delay introduced thereby.

The components 48 to 52 constitute an optical time domain reflectometer (OTDR) which operates using the signal on the respective line 16 as a transmitted signal, and correlating this with the received signal using the correlator 50. Accordingly, the fault locator can comprise, as is well known for OTDRs, a chart recorder providing a chart driven horizontally by the signal on the line 68, representing delay and hence distance along the respective fiber 30, and vertically by the signal on the line 66 representing reflected signal power. Such a chart provides an indication of the nature and location of any faults on the respective fiber 30 or in the respective subscriber's equipment.

Alternatively, the signal on the line 66 can be differentiated with respect to the signal on the line 68 and the differentiated signal can be compared with a threshold to provide information representing the nature and location of faults in an alternative form.

Numerous modifications, variations, and adaptations may be made to the embodiment of the invention described above without departing from the scope of the invention as defined in the claims. For example, the components 48 to 52 may be operated for each subscriber in turn under the control of the circuitry 46 rather than being triggered only in the event of an alarm signal, either in place of or in addition to the threshold comparison providing such an alarm signal, or these components may be dispensed with if the extent of the information which they provide is not required. For other bit rates on the line 16, and especially for much higher bit rates of the order of 1 Gb/s or more, this signal may be interrupted to allow transmission of a conventional OTDR signal rather than being used directly itself in conjunction with the correlator 50, and the components 48 to 52 can be replaced by a conventional OTDR. In addition, wavelength division multiplexing of optical signals used for the two directions of transmission on each fiber 30 may be used to facilitate separation of the transmitted and received signals at each end of the fiber.

What is claimed is:

1. An optical fiber communications system comprising:
    a plurality of optical fibers each extending from a central location to a respective remote location, each optical fiber being coupled to an optical signal receiver at the respective remote location and being coupled to a respective optical signal transmitter and a respective optical receiver at the central location;
    means at the optical receiver at each remote location for continuously reflecting back to the respective optical fiber a minor part of light received via the fiber from the respective transmitter at the central location;
    monitoring means at the central location; and
    switching means at the central location for selectively connecting the monitoring means to an optical receiver at the central location for monitoring light received thereby via the respective fiber.

2. A system as claimed in claim 1 wherein the monitoring means comprises optical time domain reflectometry means.

3. A system as claimed in claim 1 wherein said means at the optical receiver at each remote location for reflecting a minor part of light comprises means for reflecting back to the respective optical fiber 1 to 30 percent of the light received via the fiber.

4. A system as claimed in claim 1 wherein said means at the optical receiver at each remote location for reflecting a minor part of light comprises means for reflecting back to the respective optical fiber about 15 percent of the light received via the fiber.

5. An optical fiber communications system comprising:
    a plurality of optical fibers each extending from a central location to a respective remote location, each optical fiber being coupled to an optical receiver at the respective remote location and being coupled to a respective optical transmitter and a respective optical receiver at the central location;
    means at the optical receiver at each remote location for continuously reflecting back to the respective optical fiber a minor part of light received via the fiber from the respective transmitter at the central location;

monitoring means at the central location; and switching means at the central location for selectively connecting the monitoring means to an optical receiver at the central location for monitoring light received thereby via the respective fiber;

wherein the monitoring means comprises optical time domain reflectometry means comprising means for variably delaying a signal supplied to an optical transmitter at the central location, and a correlator means for correlating the delayed signal with a signal received by an optical receiver at the central location, the optical transmitter and optical receiver being coupled to the same optical fiber.

6. A system as claimed in claim 5 wherein said means at the optical receiver at each remote location for reflecting a minor part of light comprises means for reflecting back to the respective optical fiber 1 to 30 percent of the light received via the fiber.

7. A system as claimed in claim 5 wherein said means at the optical receiver at each remote location for reflecting a minor part of light comprises means for reflecting back to the respective optical fiber about 15 percent of the light received via the fiber.

8. A bidirectional optical fiber communications system comprising:

a plurality of optical fibers each extending from a central location to a respective remote location, each optical fiber being coupled to an optical transmitter and an optical receiver at the respective remote location and being coupled to a respective optical transmitter and a respective optical receiver at the central location;

means at each remote location for continuously reflecting back to the respective optical fiber a minor part of light received via the fiber from the respective transmitter at the central location;

monitoring means at the central location; and switching means at the central location for selectively connecting the monitoring means to an optical receiver at the central location for monitoring light received thereby via the respective fiber.

9. A system as claimed in claim 8 wherein the monitoring means comprises optical time domain reflectometry means.

10. A system as claimed in claim 8 wherein said means at the optical receiver at each remote location for reflecting a minor part of light comprises means for reflecting back to the respective optical fiber 1 to 30 percent of the light received via the fiber.

11. A system as claimed in claim 8 wherein said means at the optical receiver at each remote location for reflecting a minor part of light comprises means for reflecting back to the respective optical fiber about 15 percent of the light received via the fiber.

* * * * *